(12) United States Patent
Clark et al.

(10) Patent No.: US 10,063,996 B2
(45) Date of Patent: Aug. 28, 2018

(54) METHODS AND SYSTEMS FOR PROVIDING GEOSPATIALLY-AWARE USER-CUSTOMIZABLE VIRTUAL ENVIRONMENTS

(75) Inventors: Abraham J. Clark, Miami, FL (US); John-Isaac Clark, Dale City, VA (US)

(73) Assignee: THERMOPYLAE SCIENCES AND TECHNOLOGY, North Arlington, VA (US)

( * ) Notice: Subject to any disclaimer, the term of this patent is extended or adjusted under 35 U.S.C. 154(b) by 603 days.

(21) Appl. No.: 13/370,705

(22) Filed: Feb. 10, 2012

(65) Prior Publication Data

US 2012/0208564 A1 Aug. 16, 2012

Related U.S. Application Data (60) Provisional application No. 61/442,167, filed on Feb. 11, 2011.

(51) Int. Cl.
| | |
|---|---|
| *H04W 4/02* | (2018.01) |
| *H04L 29/06* | (2006.01) |
| *G06Q 30/02* | (2012.01) |
| *G06F 17/30* | (2006.01) |

(52) U.S. Cl.
CPC .......... *H04W 4/02* (2013.01); *G06F 17/3087* (2013.01); *G06Q 30/0261* (2013.01); *H04L 67/38* (2013.01)

(58) Field of Classification Search
CPC ...... G06F 8/65; G06F 9/4443; G06F 17/3087; G06F 17/30247; G06F 17/30265; H04L 67/38; H04L 67/18; H04L 67/22; H04W 4/02; H04N 21/4524; H04M 1/72572; G06Q 30/02; G06Q 30/0261

USPC ........ 455/414.1, 456.1, 456.2, 456.3, 456.6, 455/457; 709/221, 222, 223, 229; 715/738, 742, 749, 760, 762, 763
See application file for complete search history.

(56) References Cited

U.S. PATENT DOCUMENTS

| | | | | |
|---|---|---|---|---|
| 8,073,461 | B2 * | 12/2011 | Altman et al. ............. | 455/456.1 |
| 2006/0240862 | A1 * | 10/2006 | Neven et al. ............... | 455/550.1 |
| 2007/0239813 | A1 * | 10/2007 | Pinder et al. ................ | 708/270 |
| 2008/0268876 | A1 * | 10/2008 | Gelfand ................ | G06Q 30/02 455/457 |
| 2009/0248883 | A1 * | 10/2009 | Suryanarayana et al. .... | 709/229 |
| 2010/0161658 | A1 * | 6/2010 | Hamynen ........... | G06F 17/3087 707/770 |

(Continued)

FOREIGN PATENT DOCUMENTS

WO   WO 2011013910 A2 *  2/2011

*Primary Examiner* — George Eng
*Assistant Examiner* — Hung Du
(74) *Attorney, Agent, or Firm* — MH2 Technology Law Group LLP (57) ABSTRACT

Methods and systems are provided for generating and delivering data content to a mobile device using geospatially-aware virtual environments. A virtual environment management system generates a virtual environment based on a hybrid application having one or more functionality associated with an activation condition, and provides the virtual environment to the mobile device. The virtual environment management system then determines that a location of the mobile device satisfies the activation condition, and activates the one or more functionality for the virtual environment.

17 Claims, 9 Drawing Sheets

(56) References Cited

U.S. PATENT DOCUMENTS

2012/0122491 A1* 5/2012 Kim et al. ................ 455/456.3
2013/0012237 A1* 1/2013 Hamynen et al. ......... 455/456.3

* cited by examiner

METHODS AND SYSTEMS FOR PROVIDING GEOSPATIALLY-AWARE USER-CUSTOMIZABLE VIRTUAL ENVIRONMENTS

CLAIM OF PRIORITY

The present application relates to U.S. Provisional Application No. 61/442,167 filed Feb. 11, 2011, entitled "Methods and Apparatus for Providing Customizable Virtual Environments Using Mobile Devices," by Abraham J. Clark and John-Isaac Clark, from which provisional application priority is claimed, and which provisional application is incorporated by reference herein.

FIELD

The present teachings relate generally to methods and systems for providing location-specific interactive content and virtual environments using mobile devices, by delivering user- and peer-customizable geospatially-aware virtual environments adapted to the mobile devices' location, spatial orientation, and/or movement.

BACKGROUND

Advancements in cellular communication technology and mobile communication devices, such as the integration of location tracking technology onto such communication devices, incorporation of web applications and multimedia services into cellular communication networks, and the like, have added greater flexibility, processing power, and communication capabilities to already ubiquitous mobile communication devices. As a result, such mobile communication devices have become more popular in the consumer marketplace, and many consumers now rely on their mobile communication devices, such as cellular phones, to make purchase decisions, conduct financial transactions, exchange messages in their social network, take and view pictures and videos, and carry out other activities.

Information content can be targeted, delivered, and/or priced based on the click-thru and conversion rates of the content by the intended recipients, which are affected by the relevance of the information content and the timeliness of its delivery. In the past and at present time, content delivery platforms have relied on various mechanisms for targeting information content, such as tracking cookies and profiles of targeted users. Moreover, existing content delivery platforms are generally designed to provide content to recipients without tailoring the content to the recipients' location.

SUMMARY

According to the present teachings in one or more aspects, methods and systems are provided for delivering location-specific interactive content and virtual environments to mobile devices based on the mobile devices' physical context. As described herein, a virtual environment management system provides user/peer-customizable and geospatially-aware virtual environments adapted to the mobile devices' location (e.g., latitude and longitude and/or altitude), spatial orientation, movement, or other physical contexts.

The virtual environment management system, according to exemplary embodiments of the present teachings, provides a dynamic platform for users (e.g., businesses, events, locations, venues, groups, causes, organizations, agencies, individuals, etc.) to create geospatially-aware functionality through a dashboard (e.g., a Web-based interface, a software application, etc.), and then expose the functionality to a mobile application. End-users, such as mobile device users, can use the mobile application to search for, browse through, and interact with location-specific data content via a map interface, an augmented reality viewer, and/or other geospatially-aware virtual environments provided by the exposed functionality. The virtual environment management system gives the users the tools to enrich and customize the end-users' mobile experience and increase the value and relevance of data content delivered to the end-users via the mobile application.

The dashboard of the virtual environment management system enables the users to customize, personalize, define, combine, and create features and elements within the mobile application. In various embodiments, the users can use the dashboard to define an activation condition for conditional functionality in the mobile application, such as where, when, and/or to whom they want to expose the conditional functionality, for example, at a business, at an event, at a concert venue during a scheduled performance, at a stadium during a scheduled game, and the like. The users can also use the dashboard to customize pre-built elements (e.g., menus, lists, calendars, news feeds, photo galleries, multimedia players, etc.) or create their own elements for their functionality. In further embodiments, the users can publish their functionality for the end-users to view, utilize, or even further customize. Thus, in addition to allowing the users to create and define the end-users' mobile experiences, the virtual environment management system enables a community of end-users to explore, share, and customize their own mobile experiences.

DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to exemplary embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific embodiments in which may be practiced. These embodiments are described in sufficient detail to enable those skilled in the art to practice these embodiments and it is to be understood that other embodiments may be utilized and that changes may be made without departing from the scope of the present teachings. The following description is, therefore, merely exemplary.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1A:
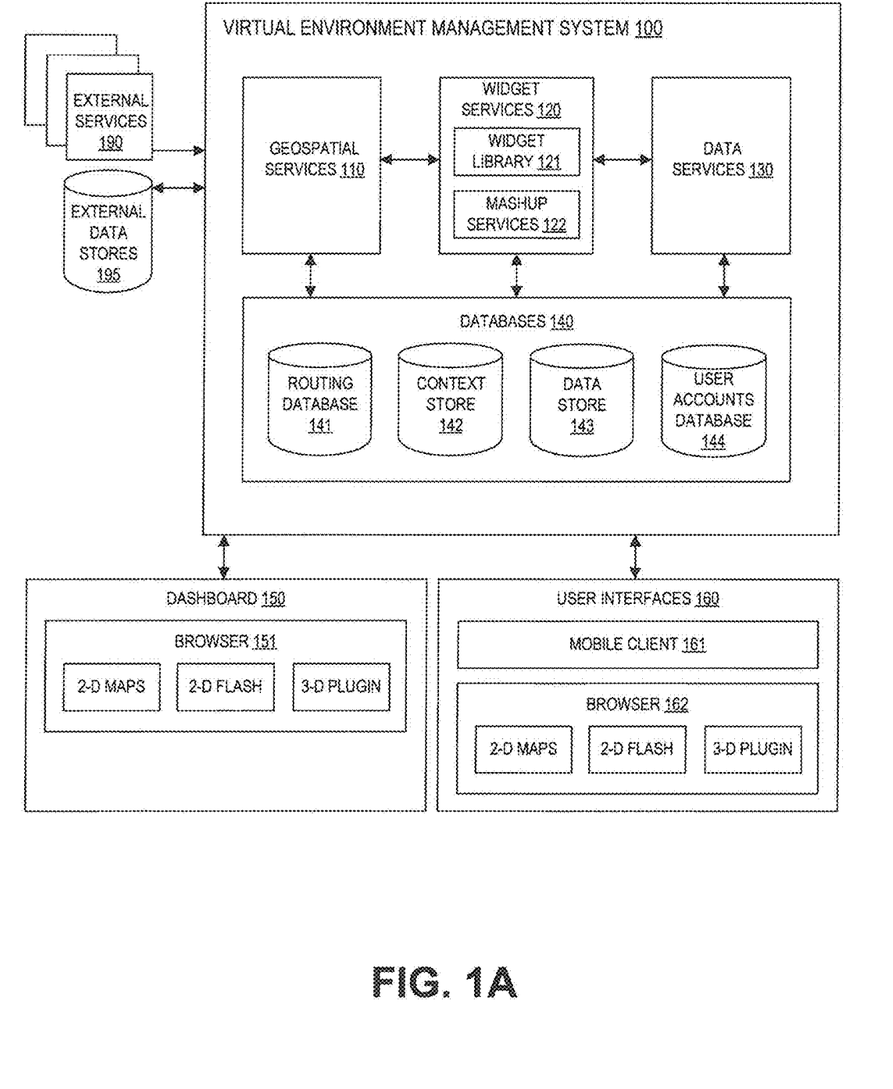
FIG. 1A illustrates an exemplary virtual environment management system that provides geospatially-aware and user- and peer-customizable virtual environments for performing real-time information sharing and management, consistent with various embodiments of the present teachings.

FIG. 1A illustrates an exemplary embodiment of a virtual environment management system 100 that provides a framework for users to create and customize geospatially-aware functionality for a mobile application through a digital dashboard, and then publish or expose the functionality to the mobile application. Users can include, for example, businesses, events, locations, venues, groups, causes, organizations, agencies, individuals, and the like, that use virtual environment management system 100 to create, customize, and publish location-specific interactive content and geospatially-aware virtual environments. End-users, such as mobile device users, can use the mobile application to search for and access location-specific data content via a map interface, an augmented reality viewer, and/or other geospatially-aware virtual environments provided by the users. A virtual environment is an interactive graphical user interface that simulates and/or augments an end-user's physical environment, which can be determined or inferred from location and sensor data, user input, and/or other contextual information provided by the end-user or the end-user's mobile device.

This framework gives the users the tools to enrich the end-users' mobile experience and increase the value and relevance of data content delivered to the end-users. More particularly, in various aspects, and as generally shown in the figures, platforms and techniques for creating, customizing, and managing location-specific interactive content and geospatially-aware virtual environments are provided, to allow users to create and define end-users' mobile experiences and enable a community of end-users to explore, share, and customize their own mobile experiences. In the embodiment shown in FIG. 1A, virtual environment management system 100 can include geospatial services 110, widget services 120, data services 130, and databases 140. Virtual environment management system 100 can further provide or incorporate a dashboard 150 and user interfaces 160.

In various embodiments, geospatial services 110 can provide geospatial and routing services, such as ingesting and combining geospatial, navigation, and other data from multiple sources into a composite two- or three-dimensional user-customizable geospatial interface for visualization, searching, browsing, routing, and reality augmentation. Widget services 120 can provide tools and libraries for creating and customizing widgets and applications that dynamically generate graphical user interfaces and virtual environments to interact with end-users. Widgets can include pre-built elements such as, for example, menus, lists, calendars, news feeds, photo galleries, multimedia players, and the like. Data services 130 can receive, retrieve, integrate, transform, and store static and dynamic data from various data sources and provide data to various data consumers.

Databases 140 can include a routing database 141, a context store 142, a data store 143, a user accounts database 144, and the like. Routing database 141 can store and supply routing and navigation data used by, for example, geospatial services 110. Context store 142 can store and supply activation conditions, contexts, and various settings associated with widgets, hybrid applications, and other conditional functionality provided by widget services 120. Data store 143 can store and supply user-defined and other types of data for data services 130. User accounts database 144 can store and supply user accounts of users of virtual environment management system 100. Databases 140 can further include a geographic information system (GIS) database, a global positioning system (GPS) database, a global environmental multiscale model database, and/or other types of databases know to one skilled in the art.

Dashboard 150 can provide tools and interfaces for users to customize, personalize, define, combine, and create elements and features of geospatially-aware functionality and to publish the functionality for the other users and end-users to view, utilize, and further customize. User interfaces 160 can provide one or more intuitive interfaces for the end-users to view and interact with location-specific data content and geospatially-aware functionality provided by virtual environment management system 100.

Each of geospatial services 110, widget services 120, data services 130, databases 140, dashboard 150, and user interfaces 160 can serve as a data source, a data consumer, or both. Data sources can also include native data sources, visualization libraries, and other sources of data such as external services 190 and external data stores 195. Exemplary external services and data stores include data streams and feeds (e.g., Keyhole Markup Language feeds), a data sensor network, a GIS database or data service (e.g., GOOGLE MAPS, BING MAPS), a GPS database or data service, mobile messaging devices, manual input, and the like. Furthermore, virtual environment management system 100 can leverage, enhance, and augment existing resources that are already operational, the existing resources providing many important elements required in virtual environment management system 100. Virtual environment management system 100 can also utilize modular controllers to integrate and/or aggregate data from various sources and store the integrated data in accordance with an abstract data model, the integrated data including, for example, geospatial events, collections of objects, key/value text data stores, and the like. Modular controllers can implement and/or extend open standards such as, for example, a representational state transfer (REST) interface (e.g., REST Hypertext Transfer Protocol), Hypertext Preprocessor interfaces and objects, a Simple Object Access Protocol messaging framework, remote procedure call protocols, a JavaScript Object Notation standard, a Keyhole Markup Language standard, a Resource Description Framework data model, and the like.

In various embodiments, geospatial services 110 can ingest and process geospatial and routing/navigation data and provide a variety of features that support geospatial visualization and route planning. Geospatial services 110 can integrate geospatial, routing, and other data from multiple sources into a composite two- or three-dimensional user-customizable geospatial interface for visualization, searching, browsing, routing, and reality augmentation.

Geospatial services 110 can retrieve or access data from widget services 120, data services 130, databases 140, dashboard 150, user interfaces 160, and other data sources. For example, geospatial services 110 can access or capture, via user interfaces 160, user input and sensor data from end-users' mobile devices, such as the mobile devices' location, spatial orientation, movement, or other physical contexts. Geospatial services 110 can also receive a stream of data from external data services 190, such as GOOGLE EARTH and GOOGLE MAPS, and/or external data stores 195. After geospatial services 110 receive the geospatial and/or routing data, geospatial services 110 can format, integrate, aggregate, and/or store the data in databases 140 for processing and future retrieval.

Geospatial services 110 can geospatially display the integrated data over relative maps and imagery via user interfaces 160, along with any dynamic overlays, such as a points-of-interest overlay, a travel route overlay, a latitude/longitude overlay, a topography overlay, and the like. In doing so, geospatial services 110 can provide virtual environments through which geospatial, routing, points of interest, and other data can be exposed and employed for visualization via user interfaces 160. This functionality enables end-users to interact in real-time, via user interfaces 160 on their mobile devices, with data content relevant or specific to the mobile devices' location (e.g., latitude and longitude and/or altitude), spatial orientation, movement, or other physical contexts. Geospatial services 110 can also utilize abstract data modeling and relationship management to provide geo-enablement of non-geospatial data, such as user-defined data associated with points of interest. User-defined data can include any data defined, created, uploaded, customized, or otherwise entered by one or more users or end-users.

In various embodiments, geospatial services 110 can also provide the integrated geospatial/routing data to widget services 120 as input data for one or more widgets or applications in widget services 120. Widget services 120 can include a library 121 of widgets, such as pre-built elements including, for example, menus, lists, calendars, news feeds, photo galleries, multimedia players, and the like. Widget library 121 can also include an index or registry of widgets and a toolkit that users can use to find, create, or customize widgets. For example, using the toolkit, a restaurateur can customize a menu for her restaurant, a convention planner can create or update a list or directory of vendors and a calendar of events for a convention, an event coordinator can create or update a list of performers or competitors for an event at a venue and provide newsfeeds or multimedia relevant to the event and/or the venue, a supermarket chain can provide a sales circular for a supermarket and/or indicate the locations of the sales items in that supermarket, and the like.

Widget services 120 can further include mash-up services 122, which provide Web-based data integration services for users to author, design, modify, store, and/or publish mash-ups. Mash-ups are user-centric hybrid applications that include a combination or aggregation of services, widgets, standards-based data sources, and/or other functionality. In various embodiments, mash-up services 122 enable users to retrieve or access widgets' definitions or interfaces and combine or aggregate, via dashboard 150, one or more widgets and other functionality into a hybrid application, other functionality including, for example, services provided by geospatial services 110, data services 130, external services 190, and the like. Mash-up services 122 can also enable users to use dashboard 150 to define or revise activation conditions for activating or exposing certain widgets and other conditional functionality of the hybrid application to user interfaces 160, associate or link the widgets and services in the hybrid application with selected data sources, and store contexts, activation conditions, and settings associated with the hybrid application in databases 140. As described above, sources of data and services can include geospatial services 110, widget services 120, data services 130, databases 140, dashboard 150, external services 190, and external data sources 195. Data sources can also include user interfaces 160, through which user input (e.g., keypad, touchscreen, microphone, etc.) and sensor data (e.g., GPS unit, gyroscope, accelerometer, image sensor, thermometer, etc.) from end-users' mobile devices can be captured.

Activation conditions can be defined with respect to mobile devices' location (e.g., latitude and longitude and/or altitude), spatial orientation, movement, or other physical and operational contexts, such as a period of time or a targeted group of users or their mobile devices. For example, activation conditions can include where, when, and/or to whom to expose the widgets and other functionality of the hybrid application, such as at a business, at an event, at a concert venue during a scheduled performance, at a stadium during a scheduled game, and the like. When virtual environment management system 100 determines that one or more activation conditions for conditional widgets in a hybrid application are met or satisfied, widget services 120 can populate the conditional widgets in the hybrid application with data from the selected data sources and present the populated widgets in an integrated manner. Widget services 120 can present the populated widgets, for example, via user interfaces 160.

Mash-up services 122 can include or provide a sandbox that allows users to experiment with a hybrid application prior to publishing the hybrid application to other users and/or end-users in virtual environment management system 100. For example, the sandbox can provide users with the capability to use dashboard 150 to graphically select and arrange the widgets and services in the hybrid application, store the hybrid application in user accounts associated with the users, test and preview the hybrid application using test data or data from replicated or selected data sources, and the like. The sandbox can utilize or build on a mash-up editor or composition tool, examples of which include GOOGLE APP ENGINE, YAHOO!, PIPES, MICROSOFT POPFLY, and the like.

In various embodiments, virtual environment management system 100 can incorporate or provide dashboard 150 for users to interface with virtual environment management system 100 and to create, customize, manage, and publish location-specific interactive content and geospatially-aware virtual environments. For example, a user can use dashboard 150 to create a user account with virtual environment management system 100 or log onto an existing user account to retrieve previously-saved hybrid applications, customizations, and settings. The user can use dashboard 150 to interface with geospatial services 110 to manage or customize geospatial and routing services, such as selecting which dynamic overlay to use and what user-defined data to display. The user can also use dashboard 150 to interface with widget services 120 to create, customize, save, and publish widgets and hybrid applications that the user owns or has created, interface with data services 130 to manage or customize data services used to populate the widgets and other functionality, and save hybrid applications, customizations, and settings in a user account associated with the user that owns the hybrid applications. Dashboard 150 can be implemented on any number of clients that run on any operating system, such as MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, IBM AIX, and other operating systems known to one skilled in the art. Dashboard 150 can interact with users via a browser 151, such as INTERNET EXPLORER, CHROME, FIREFOX, SAFARI, and the like. Browser 151 can utilize one or more browser plug-ins, such as the GOOGLE EARTH plug-in, the ADOBE FLASH PLAYER plug-in, and/or other two- and three-dimensional browser plug-ins known to one skilled in the art. Users can select an area of the globe that they typically work in and save it as their "home" when they log-on to virtual environment management system 100.

As shown in FIG. 1A, virtual environment management system 100 can incorporate or provide user interfaces 160 for end-users to access and interact with, via mobile devices, services and data content from various sources, such as geospatial services 110, widget services 120, data services 130, databases 140, dashboard 150, external services 190, external data sources 195, etc. Data sources can also include user input and sensors on the mobile devices.

In various embodiments, user interfaces 160 can use the mobile devices' inputs and sensors to detect the location, spatial orientation, movement, and/or other contextual data associated with mobile devices. The detection and identification of the location of mobile devices, for example, can be performed or supplemented using various positioning services, such as GPS, Assisted GPS (A-GPS), base station triangulation or trilateration, the European Galileo position system, or other positioning or location services or techniques. The detection and identification of the orientation or movement of the mobile devices, for example, can be performed using various sensors, such as gyroscopes, accelerometers, image sensors, and/or other orientation and movement detection sensors or techniques. Image sensors can be any type of electronic device capable of generating image data and can be built into the mobile devices. In operation, a mobile device user can point the image sensor in a general direction of a target, and the image sensor can generate image data after capturing an area covering the target. Mobile devices can also include other types of sensors, such as temperature sensors, that can provide other types of contextual data.

User interfaces 160 can interact with end-users via a mobile client 161, such as GOOGLE EARTH APPLICATION and/or a client built on, for example, GOOGLE EARTH technology, which has a set of capabilities such as zooming-in and out of various locations, tilting the view for over-the-horizon perspectives, panning on a certain area, and the like. User interfaces 160 can be implemented on any number of clients that run on any mobile operating system, such as GOOGLE ANDROID, APPLE iOS, MICROSOFT WINDOWS MOBILE and WINDOWS 8, SYMBIAN OS, LINUX, QUALCOMM BREW, BLACKBERRY OS, and other mobile operating systems known to one skilled in the art. In addition or as an alternative to mobile client 161, user interfaces 160 can interact with end-users via a browser 162, such as the ANDROID browser, GOOGLE CHROME, APPLE SAFARI, INTERNET EXPLORER MOBILE, FIREFOX FOR MOBILE, OPERA MOBILE, SKYFIRE, and the like. Browser 162 can utilize one or more browser plug-ins, such as the GOOGLE EARTH plug-in, the ADOBE FLASH PLAYER plug-in, and/or other two- and three-dimensional browser plug-ins known to one skilled in the art.

In various embodiments, user interfaces 160 can leverage, enhance, and/or augment existing applications or resources on the mobile devices. For example, user interfaces 160 can provide an augmented reality viewer that overlays or superimposes, in real-time, computer-generated graphics over one or more images captured by an image sensor in viewfinder mode. Computer-generated graphics can include a dynamic overlay, such as a points-of-interest overlay, a travel route overlay, a latitude/longitude overlay, a topography overlay, and the like. Virtual environment management system 100 can generate a dynamic overlay for an image based on image data and/or sensor data provided by a mobile device. For example, virtual environment management system 100 can perform feature recognition or other types of image recognition to detect points of interest in the image, and then generate an overlay based on the detected points of interest. Virtual environment management system 100 can also generate or refine the dynamic overlay based on sensor data provided by the mobile device, such as a location, a spatial orientation, movement, or other sensor data provided by the mobile device.

The maps and images accessible to the users and end-users via dashboard 150 and user interfaces 160 can be managed locally but can also be extended by concurrently integrating community globe information using server-side resources such as, for example, GOOGLE EARTH and MAPS products provided by the National Geospatial-Intelligence Agency, and sharing maps and images via secure networks such as the Secret Internet Protocol Router Network, the Joint Worldwide Intelligence Communications System, and the like. Additional exemplary server-side resources can include GOOGLE EARTH SERVER, Hypertext Preprocessor, the JAVA platform, JAVASCRIPT, POSTGRESQL, POSTGIS, PLPYTHON, LINUX-based web servers, and other server-side resources known to one skilled in the art. Users and end-users can toggle the visibility of these underlying imagery or maps resources.

Figure 1B:
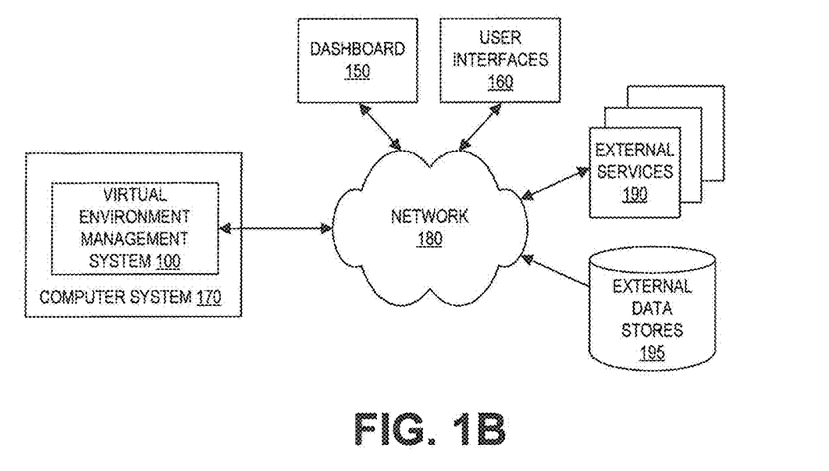
FIGS. 1B and 1C illustrate various embodiments of the virtual environment management system, consistent with various embodiments of the present teachings.

According to embodiments, virtual environment management system 100 can be implemented on any type of computer system, such as server computers, desktop computers, thin clients, virtual machines, laptops, mobile devices, tablet computers, smartphones, personal digital assistants, and the like. The computer system can include the components of a conventional computer system, for example, components as described below in FIG. 14. In embodiments, the computer system implementing virtual environment management system 100 can be configured to operate in conjunction with other computer systems. As illustrated in FIG. 1B, for example, virtual environment management system 100 can be implemented on a computer system 170 that is coupled to a network 180. Network 180 can include one or more communication networks, such as a local area network, a wide area network, the Internet, a cloud-based network, a cellular network, and the like. In this example, virtual environment management system 100 can provide and/or communicate with the users and end-users via network 180. For instance, virtual environment management system 100 can communicate with the users and end-users via a network-based interface, such as dashboard 150 and user interfaces 160. As such, the users and end-users can utilize virtual environment management system 100, via dashboard 150 or user interfaces 160, from a remote computer system coupled to network 180. Additionally, virtual environment management system 100 can communicate with external services 190 and/or external data stores 195 via network 180. For instance, dashboard 150, user interfaces 160, external services 190, and/or external data stores 195 can be supported by one or more remote computer systems coupled to network 180.

In the example illustrated in FIG. 1B, virtual environment management system 100 can provide dashboard 150 and/or user interfaces 160 via network 180 to a remote computing system. Likewise, for example, virtual environment management system 100 can be locally stored and executed on a computer system. As such, virtual environment management system 100 can provide dashboard 150 and/or user interfaces 160 as a graphical user interface to allow the users and end-users to utilize virtual environment management system 100. Similarly, while external services 190 and external data stores 195 are illustrated as being remotely located from virtual environment management system 100, any of external services 190, external data stores 195, and/or other types of services and data sources can be implemented locally on the computer system implementing virtual environment management system 100. One skilled in the art will realize that virtual environment management system 100, dashboard 150, user interfaces 160, external services 190, and external data stores 195, can be implemented on any type of computer system or systems configured in any type of arrangement.

Figure 1C:
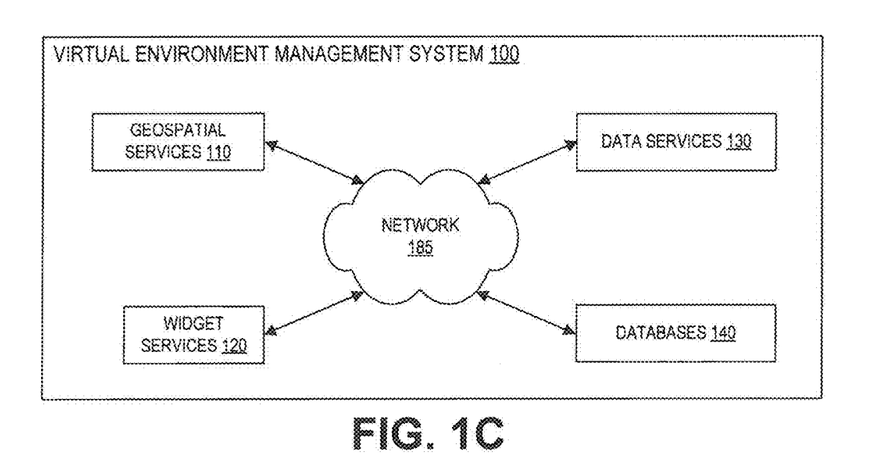
Figure 5:
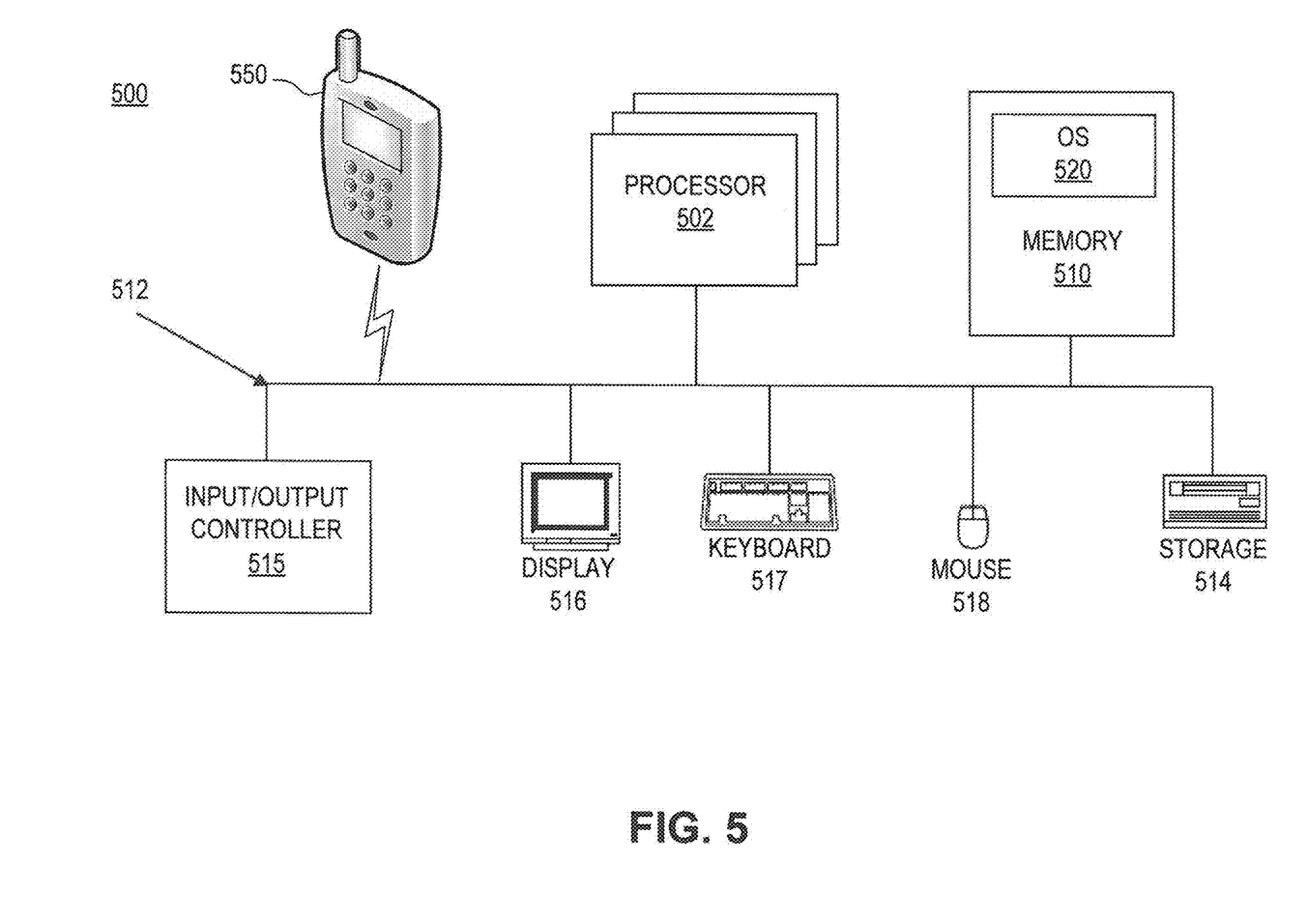
FIG. 5 illustrates a computer system that is consistent with embodiments of the present teachings.

In embodiments, virtual environment management system 100 can be implemented as an application program that is capable of being stored on and executed by an type of computer system, for example, as illustrated in FIG. 5. Virtual environment management system 100 can be written in a variety of programming languages, such as JAVA, C++, Python code, VISUAL BASIC, HTML, XML, and the like to accommodate a variety of operating systems, computing system architectures, etc. The modules and/or components of virtual environment management system 100 can be implemented in a single application program capable of executing on any type of computer systems. Likewise, the modules and/or components of virtual environment management system 100 can be implemented as separate application programs that are capable of executing on separate computer systems. For example, as illustrated in FIGS. 1A and 1C, the modules and/or components in virtual environment management system 100, such as geospatial services 110, widget services 120, data services 130, and databases 140, can be separate and can communicate via a communication network 185. While FIGS. 1A and 1C illustrate all the modules and/or components in virtual environment management system 100 are separate, any number of the modules and/or components in virtual environment management system 100 can be separate and/or located in the same application program.

Exemplary embodiments of virtual environment management system 100, such as those described herein and illustrated in FIGS. 1A-C, are intended to present concepts in a concrete fashion and are described in sufficient detail to enable those skilled in the art to practice these embodiments. However, other embodiments can be utilized and changes can be made without departing from the scope of the present teachings.

Figure 2:
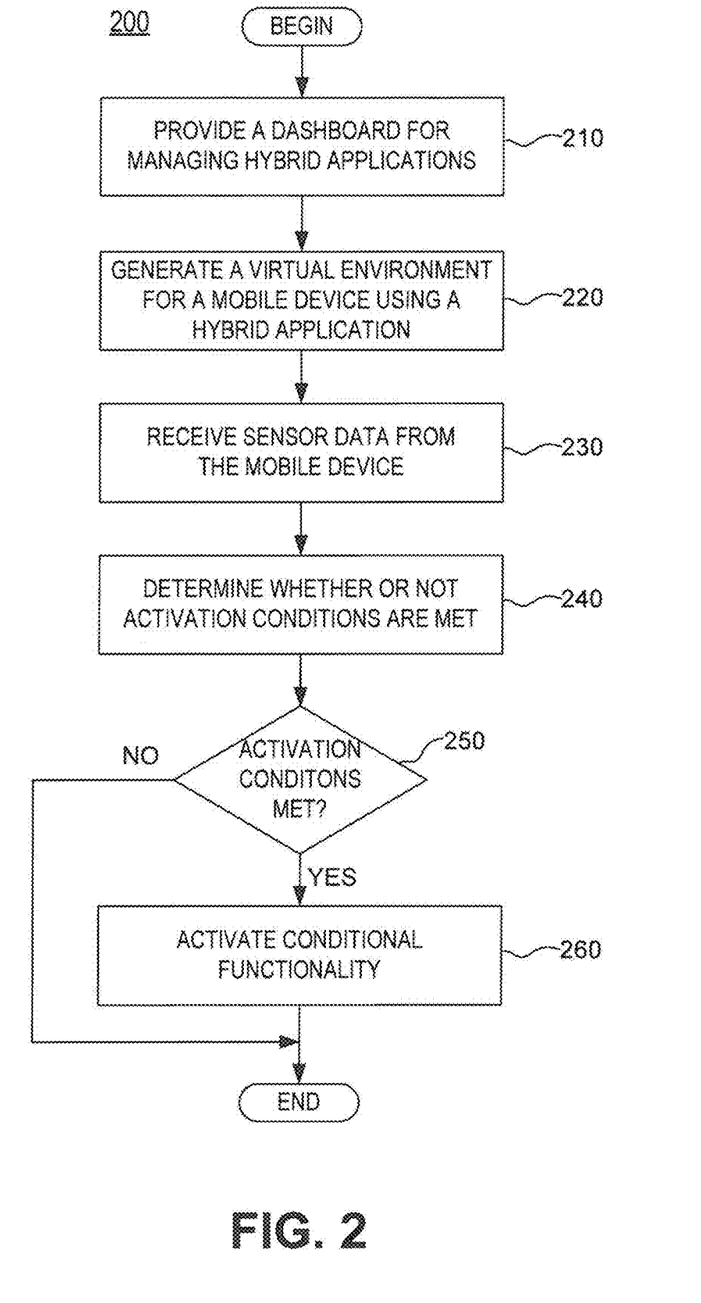
FIG. 2 illustrates exemplary methodologies illustrating the relationship and workflow among various components of the virtual environment management system, consistent with various embodiments of the present teachings.
Figure 3A:
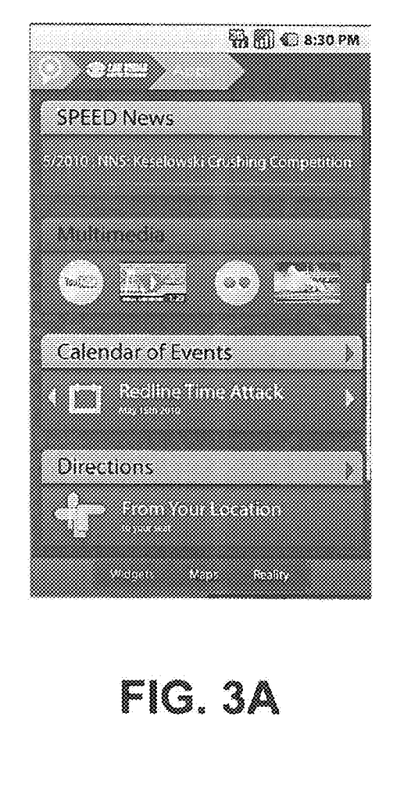
FIGS. 3A-F and 4A-H illustrate screenshots of exemplary graphical user interface and user-interactive virtual environments associated with the virtual environment management system, according to an embodiment of the present teachings.
Figure 3B:
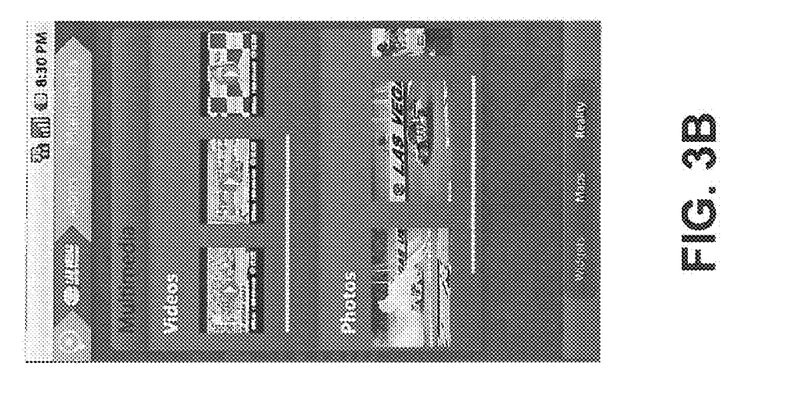
Figure 3C:
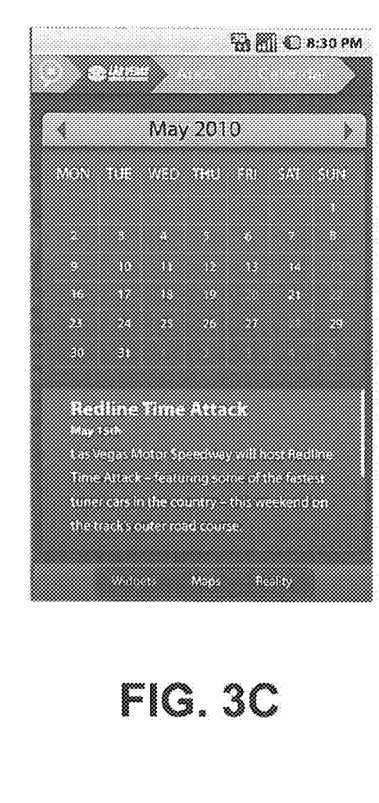
Figure 3D:
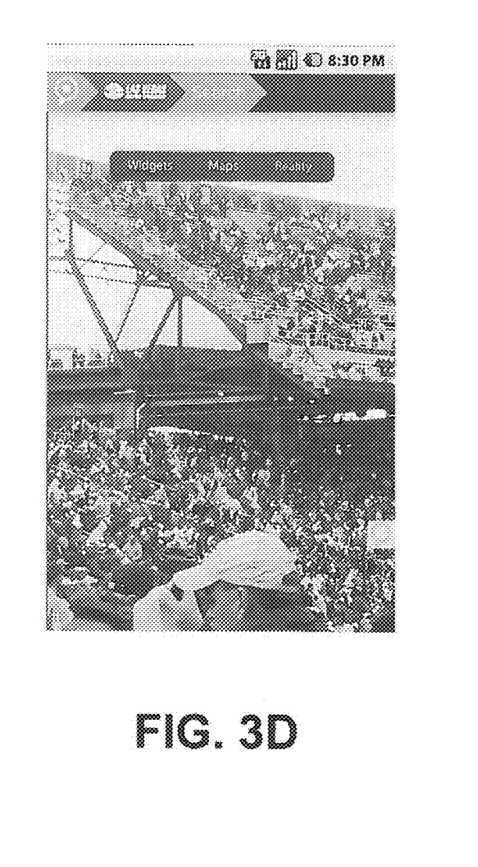
Figure 3E:
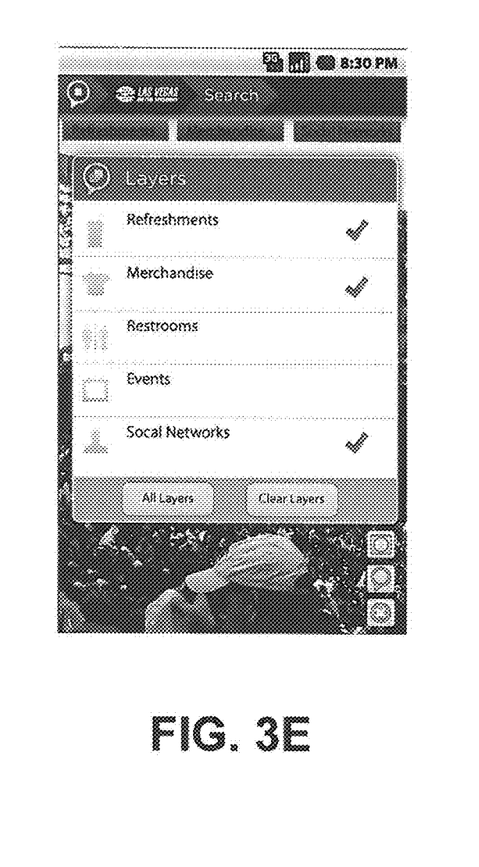
Figure 3F:
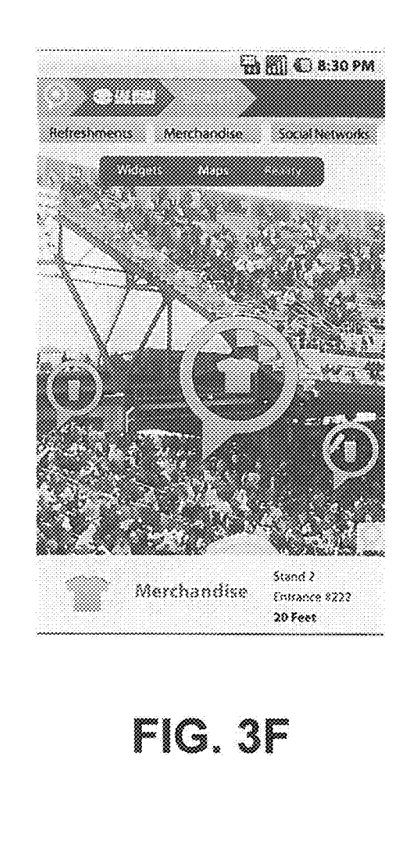
Figure 4A:
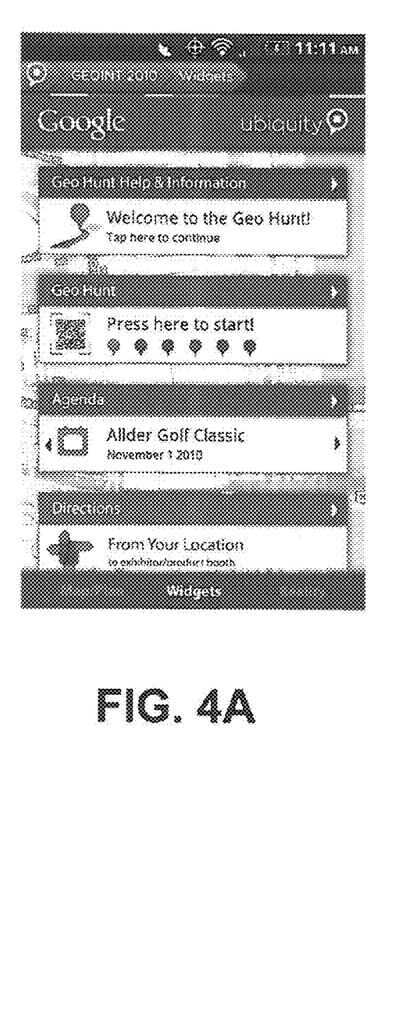
Figure 4B:
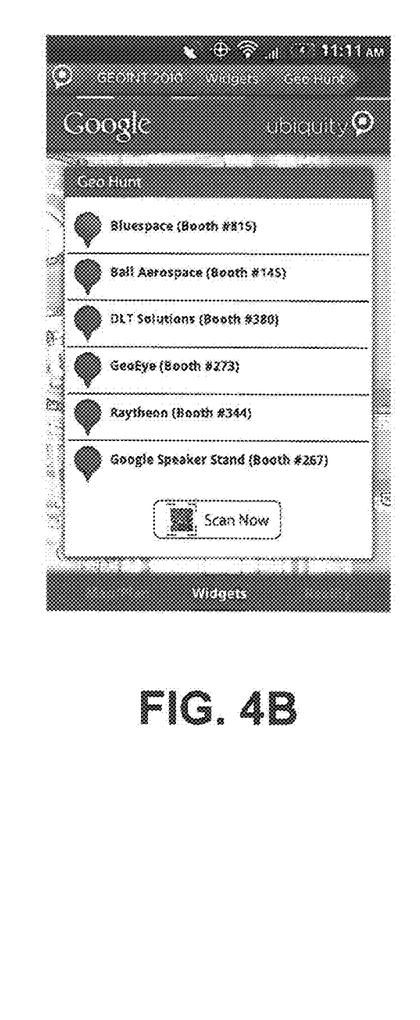
Figure 4C:
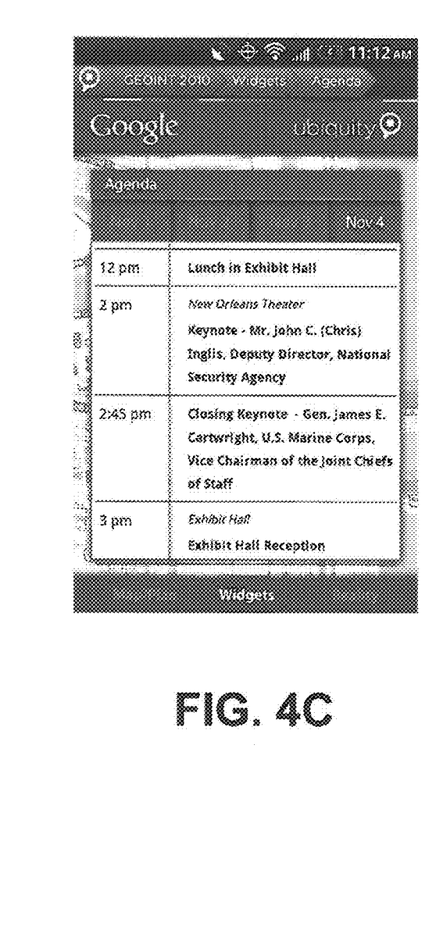
Figure 4D:
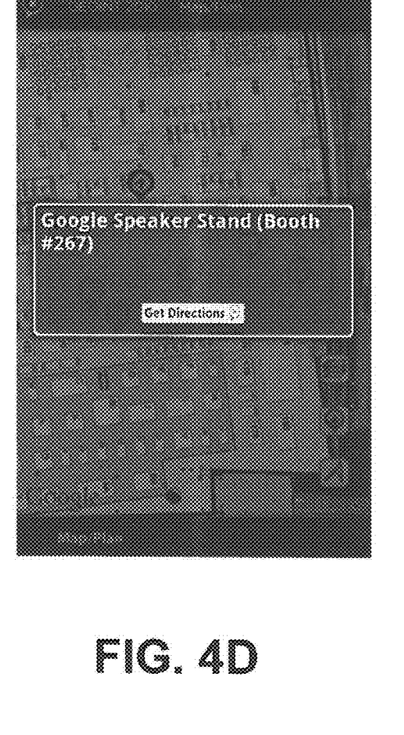
Figure 4E:
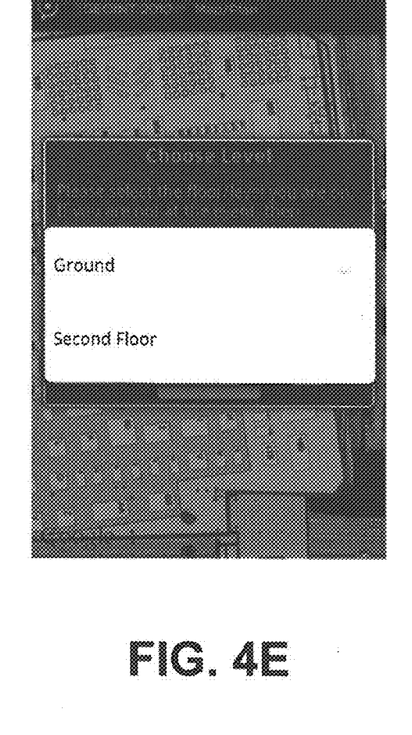
Figure 4F:
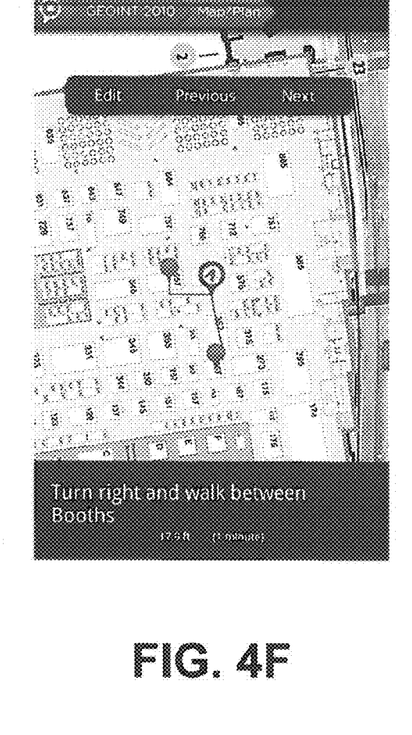
Figure 4G:
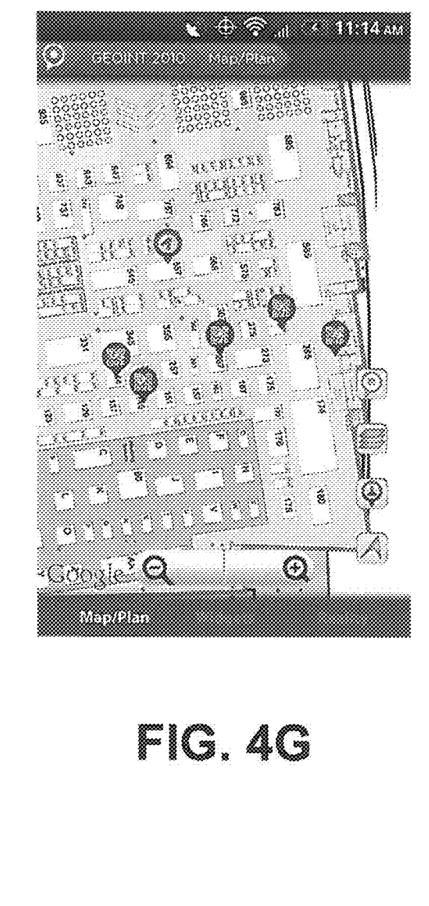
Figure 4H:
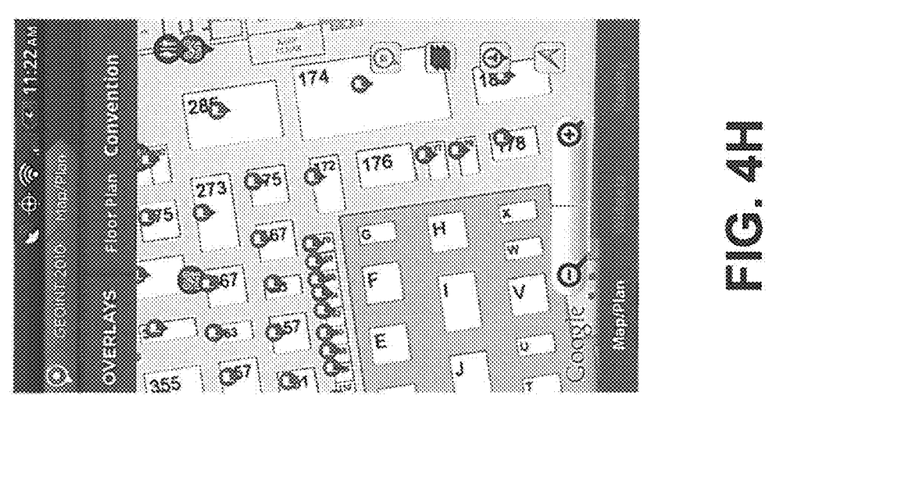

FIG. 2 illustrates a flowchart of processing 200 that can be performed by virtual environment management system 100 for users to generate location-specific interactive content and geospatially-aware virtual environments and deliver the content and virtual environments to end-users, in accordance with various embodiments of the present teachings.

Processing 200 begins in 210, during which virtual environment management system 100 can provide dashboard 150 for users to interface with virtual environment management system 100. In various embodiments, users can use dashboard 150 to create, customize, save, and publish widgets and hybrid applications that are used to provide location-specific interactive content and geospatially-aware virtual environments to end-users, such as mobile device users. Users can use dashboard 150 to create user accounts with virtual environment management system 100 or log onto existing user accounts to retrieve previously-saved hybrid applications, customizations, and settings. Users can use dashboard 150 to combine or aggregate one or more widgets, services, and other functionality into a hybrid application, define or revise activation conditions for activating or exposing the widgets, services, and other conditional functionality of the hybrid application to user interfaces 160. Using dashboard 150, users can associate or link the widgets and services in the hybrid application with selected data sources, store contexts, activation conditions, and settings associated with the hybrid application, and publish the hybrid application for other users and end-users to view, utilize, and further customize. Users can also use dashboard 150 to access a mash-up sandbox to graphically select and arrange the widgets and services in the hybrid application, store the hybrid application in user accounts associated with the users, and test and preview the hybrid application using test data or data from replicated or selected data sources.

Next, in 220, virtual environment management system 100 can use a hybrid application to, generate a virtual environment accessible to an end-user via user interfaces 160. The end-user can view and interact with, via the virtual environment, location-specific data content and geospatially-aware functionality provided by the hybrid application. In various embodiments, virtual environment management system 100 can generate the virtual environment in response to the end-user activating or accessing user interfaces 160 on a mobile device, for example, by opening mobile client 161 or entering a uniform resource locator or keyword in browser 162 to access the hybrid application.

In 230, virtual environment management system 100 can receive sensor data from the mobile device of the end-user, such as data indicating the mobile device's location, spatial orientation, and movement. Then, in 240, virtual environment management system 100 can determine whether or not activation conditions for one or more conditional widgets or functionality of the hybrid application are met. Activation conditions can be defined with respect to mobile device's location, spatial orientation, movement, or other physical and operational contexts, such as a range of time or a targeted group of users or their mobile devices. Thus, activation conditions can include where, when, and/or to whom to expose or activate the conditional widgets and functionality. If virtual environment management system 100 determines in 250 that one or more activation conditions for the conditional widgets and functionality are met or otherwise satisfied, then in 260, virtual environment management system 100 can activate the conditional widgets and functionality in the virtual environment. Finally, virtual environment management system 100 determines whether or not to continue processing 200. If yes, then processing 200 continues; if not, then processing 200 ends.

Exemplary virtual environments providing various data content and functionality are illustrated in FIGS. 3A-F and 4A-H. For example, FIGS. 3A-F depict virtual environments presented to attendees of an auto race at a motor speedway, and FIGS. 4A-H depict virtual environments presented to attendees of a convention at a convention center.

FIG. 5 illustrates a computer system 500 that is consistent with embodiments of the present teachings. In general, embodiments of the present teachings may be implemented in various computer systems, such as a personal computer, a server, a workstation, an embedded system, or a combination thereof. However, for purposes of explanation, system 500 is shown as a general purpose computer that is well known to those skilled in the art. Examples of the components that may be included in system 500 will now be described.

As shown, system 500 may include at least one processor 502, a keyboard 517, a pointing device 518 (e.g., a mouse, a touchpad, and the like), a display 516, main memory 510, an input/output controller 515, and a storage device 514. System 500 can communicate with a mobile device 550 via a wireless interface or connection (e.g., cellular networks, general packet radio services, WiMAX and Wi-Fi communication systems, and the like). System 500 may also be provided with additional input/output devices, such as a printer (not shown). The various components of system 500 communicate through a system bus 512 or similar architecture. In addition, system 500 may include an operating system (OS) 520 that resides in memory 510 during operation. One skilled in the art will recognize that system 500 may include multiple processors 502. For example, system 500 may include multiple copies of the same processor. Alternatively, system 500 may include a heterogeneous mix of various types of processors. For example, system 500 may use one processor as a primary processor and other processors as co-processors. For another example, system 500 may include one or more multi-core processors and one or more single core processors. Thus, system 500 may include any number of execution cores across a set of processors (e.g., processor 502). As to keyboard 517, pointing device 518, and display 516, these components may be implemented using components that are well known to those skilled in the art. One skilled in the art will also recognize that other components and peripherals may be included in system 500.

Main memory 510 serves as a primary storage area of system 500 and holds data that is actively used by applications running on processor 502. One skilled in the art will recognize that applications are software programs that each contains a set of computer instructions for instructing system 500 to perform a set of specific tasks, and that the term "applications" may be used interchangeably with application software, application programs, and/or programs in accordance with embodiments of the present teachings. Memory 510 may be implemented as a random access memory or other forms of memory as described below, which are well known to those skilled in the art.

OS 520 is an integrated collection of routines and instructions that are responsible for the direct control and management of hardware in system 500 and system operations. Additionally, OS 520 provides a foundation upon which to run application software. For example, OS 520 may perform services, such as resource allocation, scheduling, input/output control, and memory management. OS 520 may be predominantly software, but may also contain partial or complete hardware implementations and firmware. Well known examples of operating systems that are consistent with the principles of the present teachings include LINUX, UNIX, MAC OS by APPLE COMPUTER, SOLARIS by ORACLE CORPORATION, WINDOWS (e.g., WINDOWS CE, WINDOWS NT, WINDOWS 2000, WINDOWS XP, and WINDOWS VISTA) by MICROSOFT CORPORATION, OPEN VMS, and AIX by IBM.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 502), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible computer storage media and communication media including any medium that facilitates transfer of a computer program from one place to another. A storage media may be any available tangible media that can be accessed by a computer. By way of example, and not limitation, such tangible computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Resources described as singular or integrated can in one embodiment be plural or distributed, and resources described as multiple or distributed can in embodiments be combined. The scope of the present teachings is accordingly intended to be limited only by the following claims.

What is claimed is:

1. A method of providing data content to a mobile device using geospatially-aware virtual environments, comprising:
generating a virtual environment using a hybrid application having at least one dynamic overlay associated with an activation condition;
providing, by a server, the virtual environment to the mobile device;
determining that a location of the mobile device satisfies the activation condition;
activating the at least one dynamic overlay in the virtual environment;
receiving sensor data from the mobile device, the sensor data indicating a temperature at the mobile device; and updating the virtual environment based on the sensor data;
receiving, from the mobile device, image data representative of an image captured by and displayed on the mobile device;
detecting, by the server, one or more points of interest in the image data;
generating, by the server, overlay data in the virtual environment based on the one or more detected points of interest, wherein the server dynamically generates the overlay data that includes one or more relative locations of the one or more detected points of interest;
providing the overlay data to the mobile device to be superimposed over the image via the at least one dynamic overlay;
receiving, via a Web-based dashboard, a modification to data associated with at least one of the one or more points of interest;
modifying, dynamically by the server based on the modification, the at least one point of interest, thereby providing at least one modified point of interest;
detecting, dynamically by the server based on the modification, that the at least one modified point of interest is in the image displayed on the mobile device;
updating the overlay data in the virtual environment to include the at least one modified point of interest, thereby providing updated overlay data; and
providing the updated overlay data to the mobile device to be superimposed over the image via the at least one dynamic overlay.

2. The method of claim 1, further comprising:
modifying the hybrid application based on an interaction with a user via the Web-based dashboard.

3. The method of claim 2, wherein the data associated with the at least one point of interest includes at least one of a user-defined geospatial data or a user-defined non-geospatial data.

4. The method of claim 2, wherein modifying the hybrid application further comprises:
selecting the at least one dynamic overlay; and
integrating the at least one dynamic overlay into the hybrid application.

5. The method of claim 2, further comprising:
storing the hybrid application in an account of the user.

6. The method of claim 1, wherein generating overlay data further comprises:
receiving sensor data from the mobile device, the sensor data indicating at least one of a location, spatial orientation, or movement of the mobile device; and
generating the overlay data based on the sensor data.

7. The method of claim 1, wherein the activation condition includes at least one of a period of time or a range of time.

8. The method of claim 1, wherein activating further comprising:
linking the at least one dynamic overlay with at least one data source associated with the hybrid application; and
populating the at least one dynamic overlay with data from the at least one data source.

9. The method of claim 1, wherein the at least one dynamic overlay is provided via at least one of a service, a widget, or an application.

10. The method of claim 1, wherein the activation condition includes a temperature at the mobile device reaching a threshold.

11. The method of claim 1, further comprising:
modifying the activation condition associated with the at least one dynamic overlay based on an interaction with a user via the Web-based dashboard.

12. A system for providing data content to a mobile device using geospatially-aware virtual environments, comprising:
a server configured to:
generate a virtual environment using a hybrid application having at least one dynamic overlay associated with an activation condition;
provide the virtual environment to the mobile device;
determine that a location of the mobile device satisfies the activation condition;
activate at least one dynamic overlay in the virtual environment;
receive, from the mobile device, image data representative of an image captured by and displayed on the mobile device;
detect one or more points of interest in the image data;
generate overlay data in the virtual environment based on the one or more detected points of interest, wherein the server dynamically generates the overlay data that includes one or more relative locations of the one or more detected points of interest;
receive sensor data from the mobile device, the sensor data indicating a temperature at the mobile device;
generate the overlay data based on the sensor data;
provide the overlay data to the mobile device to be superimposed over the image via the at least one dynamic overlay;
receive, via a Web-based dashboard, a modification to data associated with at least one of the one or more points of interest;
modify, dynamically based on the modification, the at least one point of interest, thereby providing at least one modified point of interest;
detect, dynamically based on the modification, that the at least one modified point of interest is in the image displayed on the mobile device;
update the overlay data in the virtual environment to include the at least one modified point of interest, thereby providing updated overlay data;
provide the updated overlay data to the mobile device to be superimposed over the image via the at least one dynamic overlay.

13. The system of claim 12, wherein the server is further configured to modify the hybrid application based on an interaction with a user via the Web-based dashboard.

14. The system of claim 13, wherein the server is further configured to:
- select the at least one dynamic overlay; and
- integrate the at least one dynamic overlay into the hybrid application.

15. The system of claim 13, wherein the data associated with the at least one point of interest includes at least one of a user-defined geospatial data or a user-defined non-geospatial data.

16. The system of claim 12, wherein the server is further configured to modify the activation condition associated with the at least one dynamic overlay based on an interaction with a user via the Web-based dashboard.

17. A computer program product, comprising:
- a non-transitory computer-readable medium storing instructions that cause a computer to provide data content via a network to a mobile device using geo-spatially-aware virtual environments when executed by the computer, comprising:
- at least one instruction for causing the computer to generate a virtual environment using a hybrid application having at least one dynamic overlay associated with an activation condition;
- at least one instruction for causing the computer to provide the virtual environment to the mobile device;
- at least one instruction for causing the computer to determine that a location of the mobile device satisfies the activation condition;
- at least one instruction for causing the computer to activate the at least one dynamic overlay in the virtual environment;
- at least one instruction for causing the computer to receive, from the mobile device, image data representative of an image captured by and displayed on the mobile device;
- at least one instruction for causing the computer to detect one or more points of interest in the image data;
- at least one instruction for causing the computer to generate overlay data in the virtual environment based on the one or more detected points of interest, wherein the server dynamically generates the overlay data that includes one or more relative locations of the one or more detected points of interest;
- at least one instruction for causing the computer to receive sensor data from the mobile device, the sensor data indicating a temperature at the mobile device;
- at least one instruction for causing the computer to generate the overlay data based on the sensor data;
- at least one instruction for causing the computer to provide via the network the overlay data to the mobile device to be superimposed over the image via the at least one dynamic overlay;
- at least one instruction for causing the computer to receive, via a Web-based dashboard, a modification to data associated with at least one of the one or more points of interest;
- at least one instruction for causing the computer to modify, dynamically based on the modification, the at least one point of interest, thereby providing at least one modified point of interest;
- at least one instruction for causing the computer to detect, dynamically based on the modification, that the at least one modified point of interest is in the image displayed on the mobile device;
- at least one instruction for causing the computer to update the overlay data in the virtual environment to include the at least one modified point of interest, thereby providing updated overlay data; and
- at least one instruction for causing the computer to provide the updated overlay data to the mobile device to be superimposed over the image via the at least one dynamic overlay.

* * * * *